(12) United States Patent
Fukuba et al.

(10) Patent No.: US 12,247,522 B2
(45) Date of Patent: Mar. 11, 2025

(54) BURNER ASSEMBLY, GAS TURBINE COMBUSTOR, AND GAS TURBINE

(71) Applicant: MITSUBISHI HEAVY INDUSTRIES, LTD., Tokyo (JP)

(72) Inventors: Shinichi Fukuba, Tokyo (JP); Satoshi Takiguchi, Tokyo (JP); Keisuke Miura, Tokyo (JP); Tomohiro Asai, Tokyo (JP); Kenji Miyamoto, Yokohama (JP); Tomo Kawakami, Yokohama (JP); Kenta Taniguchi, Yokohama (JP); Katsuyoshi Tada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/886,802

(22) Filed: Aug. 12, 2022

(65) Prior Publication Data

US 2022/0381184 A1 Dec. 1, 2022

Related U.S. Application Data

(63) Continuation of application No. PCT/JP2020/027016, filed on Jul. 10, 2020.

(30) Foreign Application Priority Data

Apr. 22, 2020 (JP) .................... 2020-076142

(51) Int. Cl.
*F02C 7/22* (2006.01)
*F23D 14/62* (2006.01)
(Continued)

(52) U.S. Cl.
CPC ............... *F02C 7/22* (2013.01); *F23D 14/62* (2013.01); *F23R 3/002* (2013.01); *F23R 3/286* (2013.01); *F05D 2240/35* (2013.01)

(58) Field of Classification Search
CPC .......... F23R 3/286; F23R 3/045; F23R 3/283; F23R 3/30; F23R 3/32; F23R 3/002;
(Continued)

(56) References Cited

U.S. PATENT DOCUMENTS 5,235,814 A 8/1993 Leonard
7,003,958 B2 * 2/2006 Dinu .................... F23R 3/40
60/737

(Continued)

FOREIGN PATENT DOCUMENTS

DE 102009026338 4/2010
DE 102010017623 3/2011
(Continued)

OTHER PUBLICATIONS

International Search Report issued Sep. 15, 2020 in International Application No. PCT/JP2020/027016, with English translation.
(Continued)

*Primary Examiner* — Stephanie Sebasco Cheng
*Assistant Examiner* — Jingchen Liu
(74) *Attorney, Agent, or Firm* — Wenderoth, Lind & Ponack, L.L.P.

(57) ABSTRACT

A burner assembly includes a plurality of burners for mixing fuel and air. Each of the plurality of burners includes: at least one fuel nozzle for injecting the fuel; and a mixing passage into which the fuel injected from the at least one fuel nozzle and the air are introduced. Each of the at least one fuel nozzle includes a protruding portion protruding upstream of an inlet of the mixing passage in a flow direction of the air. Each of the at least one fuel nozzle includes at least one fuel injection hole formed on a side surface of the protruding portion. A top surface of the protruding portion includes a convex curved surface.

5 Claims, 15 Drawing Sheets

(51) Int. Cl.
*F23R 3/00* (2006.01)
*F23R 3/28* (2006.01)

(58) Field of Classification Search
CPC .......... F23D 14/64; F23D 14/02; F23D 14/22; F23D 14/62; F23D 14/84; F23D 2900/31019; F23D 11/40; F02C 7/224; F01D 9/023; F01D 9/06
See application file for complete search history.

(56) References Cited

U.S. PATENT DOCUMENTS

| | | | |
|---|---|---|---|
| 2003/0110774 A1* | 6/2003 | Saitoh | F23R 3/14 60/737 |
| 2010/0089367 A1 | 4/2010 | Johnson et al. | |
| 2010/0218501 A1 | 9/2010 | York et al. | |
| 2010/0323309 A1* | 12/2010 | Barkowski | F23R 3/286 431/278 |
| 2011/0057056 A1 | 3/2011 | Ziminsky et al. | |
| 2013/0045450 A1 | 2/2013 | Uhm et al. | |
| 2016/0298845 A1 | 10/2016 | Nagai et al. | |
| 2017/0198914 A1* | 7/2017 | Baumann | F23R 3/343 |
| 2019/0086093 A1* | 3/2019 | Fukuba | F23R 3/14 |
| 2021/0088216 A1 | 3/2021 | Tada et al. | |

FOREIGN PATENT DOCUMENTS

| | | |
|---|---|---|
| DE | 112019000871 | 11/2020 |
| JP | 5-196232 | 8/1993 |
| JP | 2002-257342 | 9/2002 |
| JP | 2010-91259 | 4/2010 |
| JP | 2010-203758 | 9/2010 |
| JP | 2011-058792 | 3/2011 |
| JP | 2019-168198 | 10/2019 |
| KR | 10-2016-0045636 | 4/2016 |

OTHER PUBLICATIONS

Translation of the International Preliminary Report on Patentability issued Nov. 3, 2022 in corresponding International Application No. PCT/JP2020/027016.

Office Action issued Apr. 19, 2024 in Korean Patent Application No. 10-2022-7030703, with machine translation (9 pages).

Office Action issued Feb. 29, 2024 in corresponding Chinese Patent Application No. 202080097048.2, with English translation (18 pages).

Office Action dated Sep. 10, 2024 issued in corresponding DE application No. 112020006698.3, with machine translation, 8 pages.

* cited by examiner

BURNER ASSEMBLY, GAS TURBINE COMBUSTOR, AND GAS TURBINE

This application claims the priority of Japanese Patent Application No. 2020-076142 filed in Japan on Apr. 22, 2020, the content of which is incorporated herein by reference. This application is a continuation application based on a PCT Patent Application No. PCT/JP2020/027016 whose priority is claimed on Japanese Patent Application No. 2020-076142. The content of the PCT Application is incorporated herein by reference.

TECHNICAL FIELD

The present disclosure relates to a burner assembly, a gas turbine combustor, and a gas turbine.

BACKGROUND

As a technique for achieving low NOx while maintaining flashback resistance for fuel with a high risk of flashback (e.g., hydrogen), a large number of independent short flames are formed by a burner assembly (cluster burner).

In this technique, by arranging multiple mixing passages for mixing fuel and air to reduce the scale of fuel mixing, high mixing performance can be achieved without actively using swirling flow for mixing fuel and air.

Patent Document 1 discloses a burner assembly for suppressing flashback while reducing NOx. Each burner of this burner assembly includes a fuel nozzle and a mixing passage into which fuel and air are introduced. The fuel nozzle includes a protruding portion which protrudes upstream of an inlet of the mixing passage in the air flow direction. Further, a fuel injection hole is formed on a side surface of the protruding portion. Fuel injected from the fuel injection hole enters the inlet of the mixing passage together with air, so that the fuel and the air are mixed.

Patent Document 1 describes that, by injecting the fuel from the protruding portion which protrudes upstream of the inlet of the mixing passage in the flow direction of the air, the fuel and the air are effectively mixed to suppress the variation of fuel concentration in the mixing passage and reduce NOx. Further, it describes that since the air enters upstream of the inlet of the mixing passage and downstream of the nozzle injection hole, the increase in concentration of fuel is suppressed in the vicinity of the passage wall downstream of the fuel injection hole, so that it is possible to suppress flashback (backfire).

CITATION LIST

Patent Literature

Patent Document 1: JP2019-168198A

SUMMARY

Problems to be Solved

The burner assembly described in Patent Document 1 has room for further improvement in terms of suppressing flashback.

In view of the above, an object of the present disclosure is to provide a burner assembly and a gas turbine combustor that can suppress flashback.

Solution to the Problems

In order to achieve the above object, a burner assembly according to the present disclosure includes a plurality of burners for mixing fuel and air. Each of the plurality of burners includes: at least one fuel nozzle for injecting the fuel; and a mixing passage into which the fuel injected from the at least one fuel nozzle and the air are introduced. Each of the at least one fuel nozzle includes a protruding portion protruding upstream of an inlet of the mixing passage in a flow direction of the air, and each of the at least one fuel nozzle includes at least one fuel injection hole formed on a side surface of the protruding portion. A top surface of the protruding portion includes a convex curved surface.

Advantageous Effects

The present disclosure provides a burner assembly and a gas turbine combustor that can suppress flashback.

DETAILED DESCRIPTION

Figure 1:
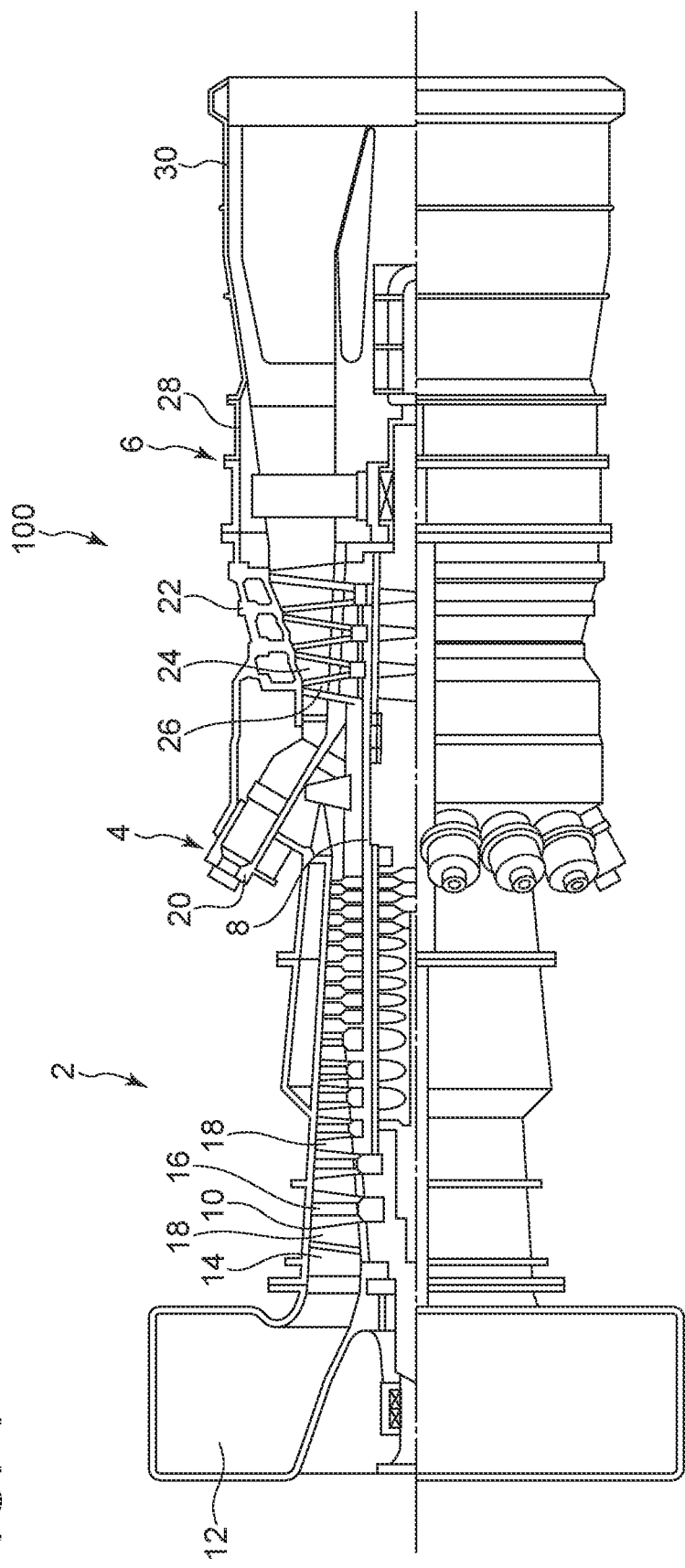
FIG. 1 is a schematic configuration diagram of a gas turbine 100 according to an embodiment.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

FIG. 1 is a schematic configuration diagram of a gas turbine 100 according to an embodiment of the present disclosure. As shown in FIG. 1, the gas turbine 100 according to an embodiment includes a compressor 2 for compressing air (i.e., producing compressed air) that serves as an oxidant supplied to a combustor 4, a combustor 4 (gas turbine combustor) for producing combustion gas using the compressed air and fuel, and a turbine 6 configured to be driven by the combustion gas discharged from the combustor 4. In the case of the gas turbine 100 for power generation, a generator (not shown) is connected to the turbine 6, so that rotational energy of the turbine 6 generates electric power.

In the combustor 4 of the gas turbine 100, a gas mixture of fuel and air is combusted to produce the combustion gas. Examples of the fuel combusted in the combustor 4 include hydrogen, methane, light oil, heavy oil, jet fuel, natural gas, and gasified coal, and one or more of them may be combined in any combination for combustion.

The compressor 2 includes a compressor casing 10, an air inlet 12 disposed on an inlet side of the compressor casing 10 for sucking in air, a rotor 8 disposed so as to penetrate both of the compressor casing 10 and a turbine casing 22, and a variety of blades disposed in the compressor casing 10. The variety of blades includes an inlet guide vane 14 disposed adjacent to the air inlet 12, a plurality of stator vanes 16 fixed to the compressor casing 10, and a plurality of rotor blades 18 implanted on the rotor 8 so as to be arranged alternately with the stator vanes 16. In the compressor 2, the air sucked in from the air inlet 12 flows through the plurality of stator vanes 16 and the plurality of rotor blades 18 to be compressed into compressed air having a high temperature and a high pressure. The compressed air having a high temperature and a high pressure is sent to the combustor 4 of a latter stage from the compressor 2.

A plurality of combustors 4 are arranged at intervals in the circumferential direction around the rotor 8. The combustor 4 is supplied with fuel and the compressed air produced in the compressor 2, and combusts the fuel to produce combustion gas that serves as a working fluid of the turbine 6. The combustion gas is sent to the turbine 6 at a latter stage from the combustor 4.

The turbine 6 includes a turbine casing 22 and a variety of blades disposed in the turbine casing 22. The variety of blades includes a plurality of stator vanes 24 fixed to the turbine casing 22 and a plurality of rotor blades 26 implanted on the rotor 8 so as to be arranged alternately with the stator vanes 24. In the turbine 6, the rotor 8 is driven to rotate as the combustion gas passes through the plurality of stator vanes 24 and the plurality of rotor blades 26. In this way, the generator (not shown) connected to the rotor 8 is driven.

Further, an exhaust chamber 30 is connected to the downstream side of the turbine casing 22 via an exhaust casing 28. The combustion gas having driven the turbine 6 is discharged outside through the exhaust casing 28 and the exhaust chamber 30.

Figure 2:
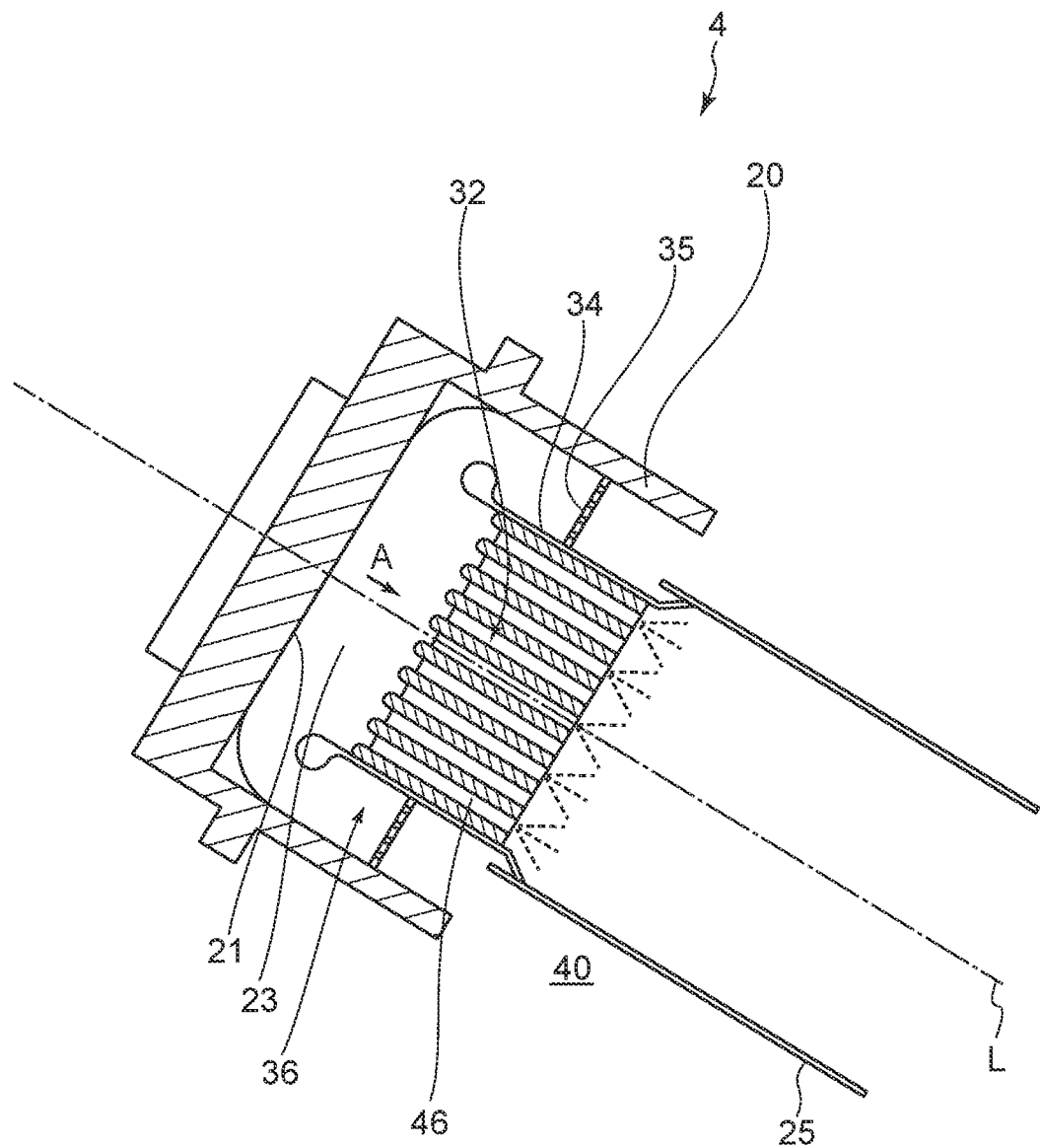
FIG. 2 is a cross-sectional view of the vicinity of a combustor 4.

FIG. 2 is a cross-sectional view of the vicinity of the combustor 4. The combustor 4 includes a burner assembly 32, a bottomed cylindrical casing 20 for accommodating the burner assembly 32, and a combustion liner 25 forming a space in which a flame is formed downstream of the burner assembly 32. In FIG. 2, the dash-dotted line indicates a central axis L common to the casing 20, the burner assembly 32, and the combustion liner 25. The burner assembly 32 is disposed inside the casing 20 of the combustor 4. In the illustrated exemplary embodiment, the burner assembly 32 is held inside a cylindrical member 34 disposed inside the casing 20. The cylindrical member 34 is supported by the casing 20 via a plurality of support portions 35 arranged at intervals around the central axis L. An air passage 36 for the compressed air flowing from a casing 40 is formed between the casing 20 and the outer peripheral surface of the cylindrical member 34 (between the casing 20 and the outer peripheral surface of the burner assembly 32).

The compressed air flowing from the casing 40 into the air passage 36 passes through an axial gap 23 between the burner assembly 32 and a bottom surface 21 of the casing 20 and enters a plurality of mixing passages 46, which will described later, of the burner assembly 32 together with fuel. The fuel and the air are mixed in the burner assembly 32, and the mixture is ignited by an ignition device (not shown) to form a flame in the combustion liner 25 and produce the combustion gas.

Figure 3:
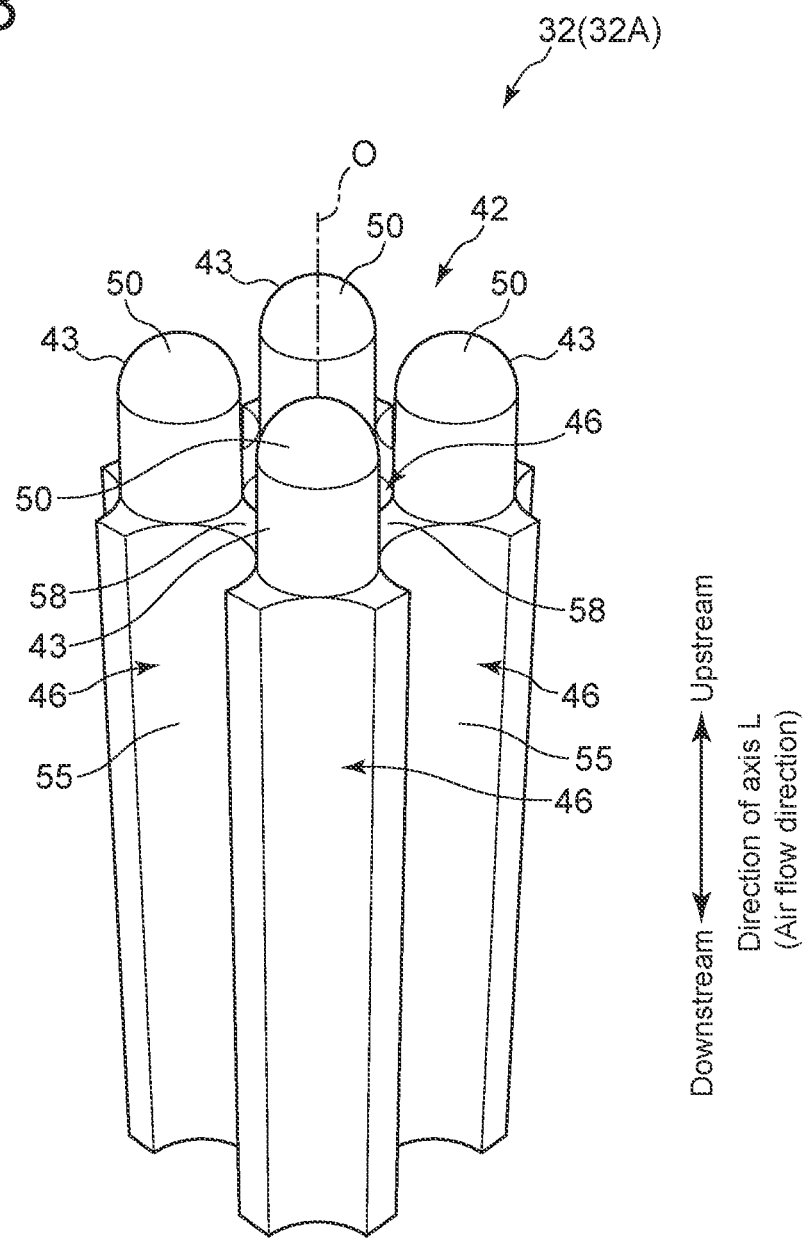
FIG. 3 is a schematic partial perspective view of a portion of a burner assembly 32 (32A) according to an embodiment.
Figure 4:
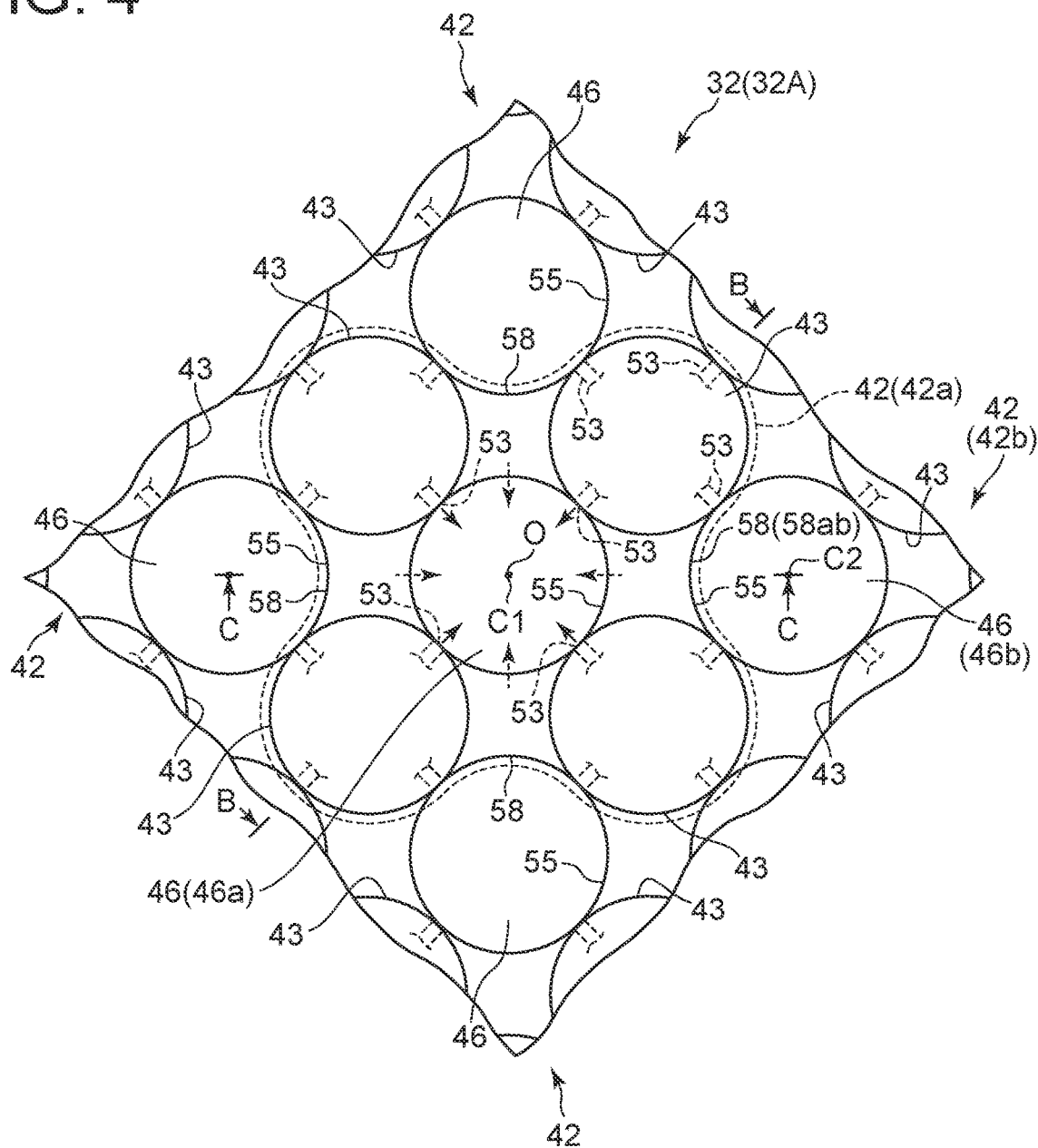
FIG. 4 is a schematic diagram of a portion of the burner assembly 32 (32A) when viewed from upstream in the air flow direction along the central axis L (example of view A in FIG. 2).
Figure 5:
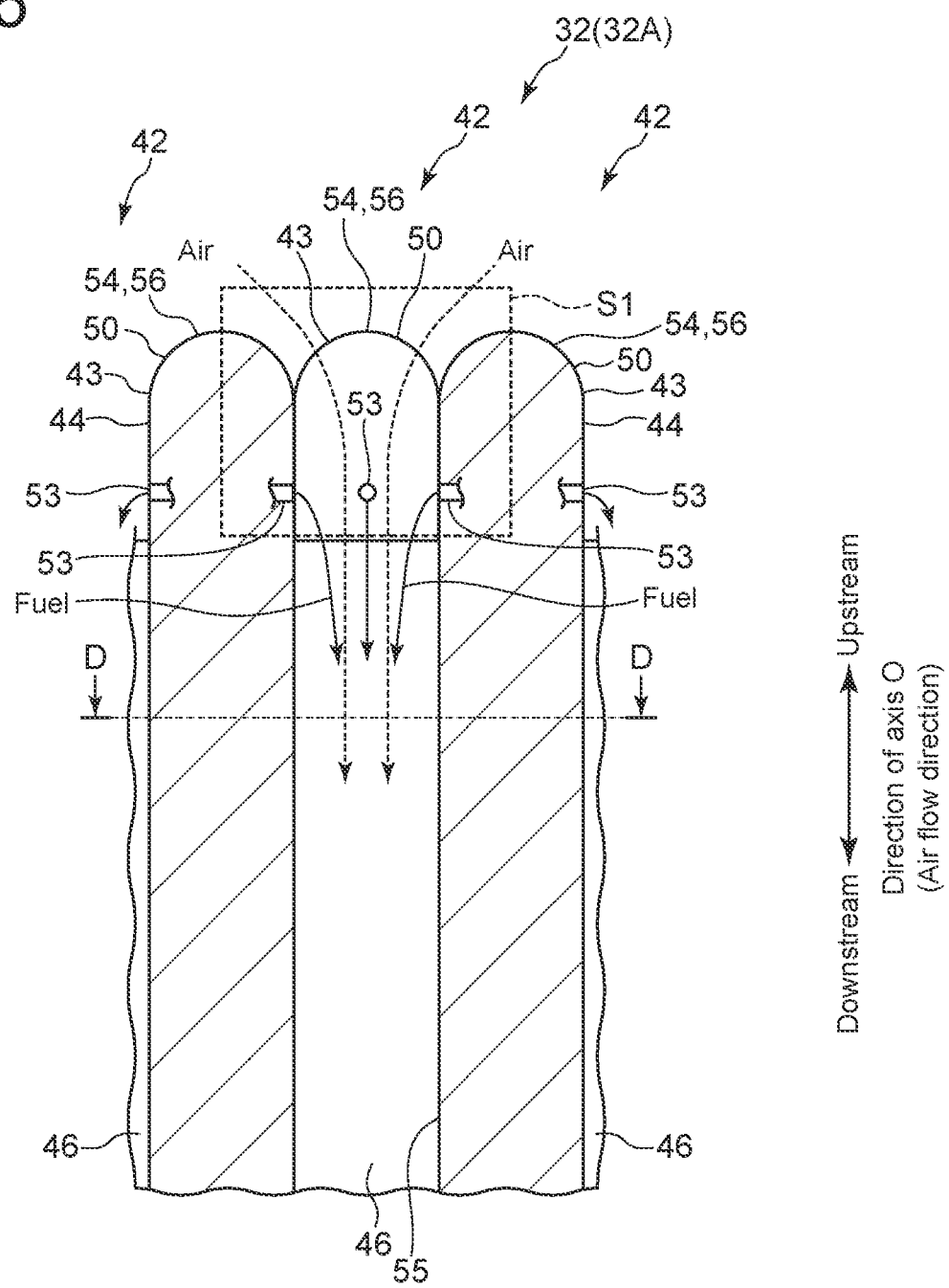
FIG. 5 is a schematic diagram showing a portion of the cross-section B-B in FIG. 4.
Figure 6:
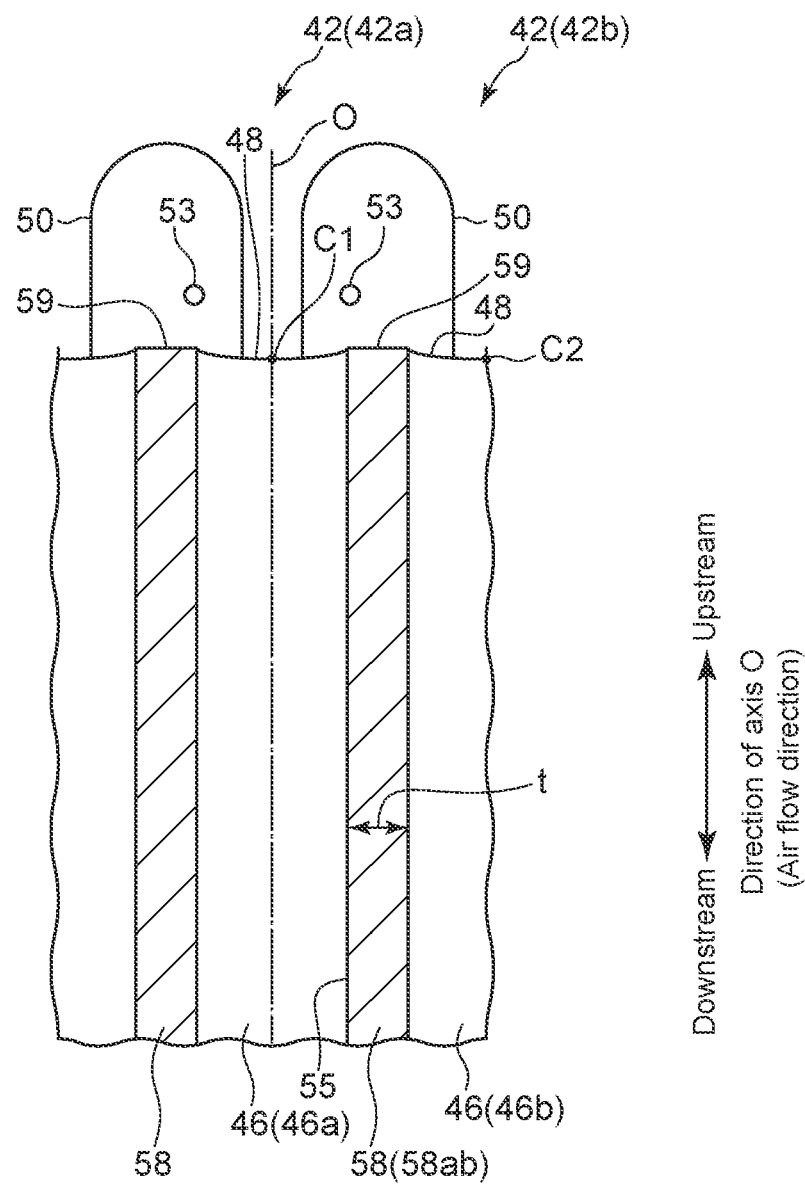
FIG. 6 is a schematic diagram showing a portion of the cross-section C-C in FIG. 4.

FIG. 3 is a schematic partial perspective view of a portion of a burner assembly 32 (32A) according to an embodiment. FIG. 4 is a schematic diagram of a portion of the burner assembly 32 (32A) when viewed from upstream in the air flow direction along the central axis L (example of view A in FIG. 2). FIG. 5 is a schematic diagram showing a portion of the cross-section B-B in FIG. 4. FIG. 6 is a schematic diagram showing a portion of the cross-section C-C in FIG. 4.

For example, as shown in FIG. 3 or FIG. 4, the burner assembly 32 includes a plurality of burners 42 for mixing fuel and air.

For example, as shown in any of FIGS. 3 to 5, each burner 42 includes a plurality of fuel nozzles 43 for injecting the fuel, and a mixing passage 46 into which the fuel injected from the plurality of fuel nozzles 43 and the compressed air supplied from the casing 40 (see FIGS. 1 and 2) are introduced. In the illustrated exemplary embodiment, each burner 42 includes one mixing passage 46 and four fuel nozzles 43 arranged around the one mixing passage 46, and the fuel is injected from the four surrounding fuel nozzles into the one mixing passage 46. In other words, four mixing passages 46 are arranged around one fuel nozzle 43, and the one fuel nozzle 43 injects the fuel into the four mixing passages 46.

Each mixing passage 46 is configured as a through hole extending in parallel with each other, and the central axis O of each mixing passage 46 extends in the direction along the central axis L of the casing 20. In the illustrated exemplary embodiment, the central axis O of each mixing passage 46 and the central axis L of the casing 20 are parallel to each other.

For example, as shown in FIG. 5, each fuel nozzle 43 includes a protruding portion 50 which protrudes upstream of an inlet 48 of the mixing passage 46 in the flow direction of the air. Further, each fuel nozzle 43 includes a plurality of fuel injection holes 53 formed on a side surface 44 of the protruding portion 50. In the exemplary embodiment shown in FIG. 4, four fuel injection holes 53 are formed on the side surface 44 of the protruding portion 50 at positions corresponding to the four mixing passages 46 around the protruding portion 50. Each fuel injection hole 53 may extend in a direction perpendicular to the central axis O so as to inject the fuel toward the central axis O of the mixing passage 46, or may extend obliquely to the direction perpendicular to the central axis O.

For example, as shown in FIG. 5, a top surface 54 of the protruding portion 50 (the end surface of the protruding portion 50 in the direction of the axis O, i.e., the tip of the protruding portion 50) includes a convex curved surface 56. In the exemplary embodiment shown in FIG. 5, the entire top surface 54 of the protruding portion 50 is composed of the convex curved surface 56 that is smoothly curved. The top surface 54 of the protruding portion 50 may be formed in a streamline shape, for example.

For example, as shown in FIGS. 4 and 6, a passage wall 55 forming the mixing passage 46 is formed in a tubular shape so as to internally define the mixing passage 46 having a circular cross-section, and functions as a mixing tube for mixing fuel and air. Hereinafter, for example, as shown in FIG. 4, among the plurality of burners 42, two burners 42 with the mixing passages 46 closest to each other are conveniently referred to as a first burner 42 (42a) and a second burner 42 (42b). As shown in FIGS. 4 and 6, the passage wall 55 forming the mixing passage 46 (46a) of the first burner 42a and the passage wall 55 forming the mixing passage 46 (46b) of the second burner 42b share a partition portion 58 (58ab) that separates the mixing passage 46a of the first burner 42a from the mixing passage 46b of the second burner 42b. In the exemplary embodiment shown in FIG. 4, the passage wall 55 of each mixing passage 46 shares the partition portion 58 with the passage walls 55 of multiple mixing passages 46 (four mixing passages 46 in the illustrated embodiment) surrounding it.

As shown in FIG. 6, the thickness t of the partition portion 58ab in the cross-section C-C of the burner assembly 32A is constant in the direction along the central axis O of the first burner 42a. An upstream end surface 59 of the partition portion 58ab in the air flow direction is formed in a flat shape. Further, as shown in FIG. 4, the thickness t of the partition portion 58ab increases as the distance from the cross-section C-C increases. As shown in FIGS. 4 and 6, the cross-section C-C is a cross-section (first cross-section) passing through the center C1 of the inlet 48 of the mixing passage 46a of the first burner 42a and the center C2 of the inlet 48 of the mixing passage 46b of the second burner 42b and taken along the central axis O of the mixing passage 46 of the first burner 42a.

The effects obtained by the burner assembly 32A will now be described in comparison with a comparative embodiment shown in FIG. 7.

Figure 7:
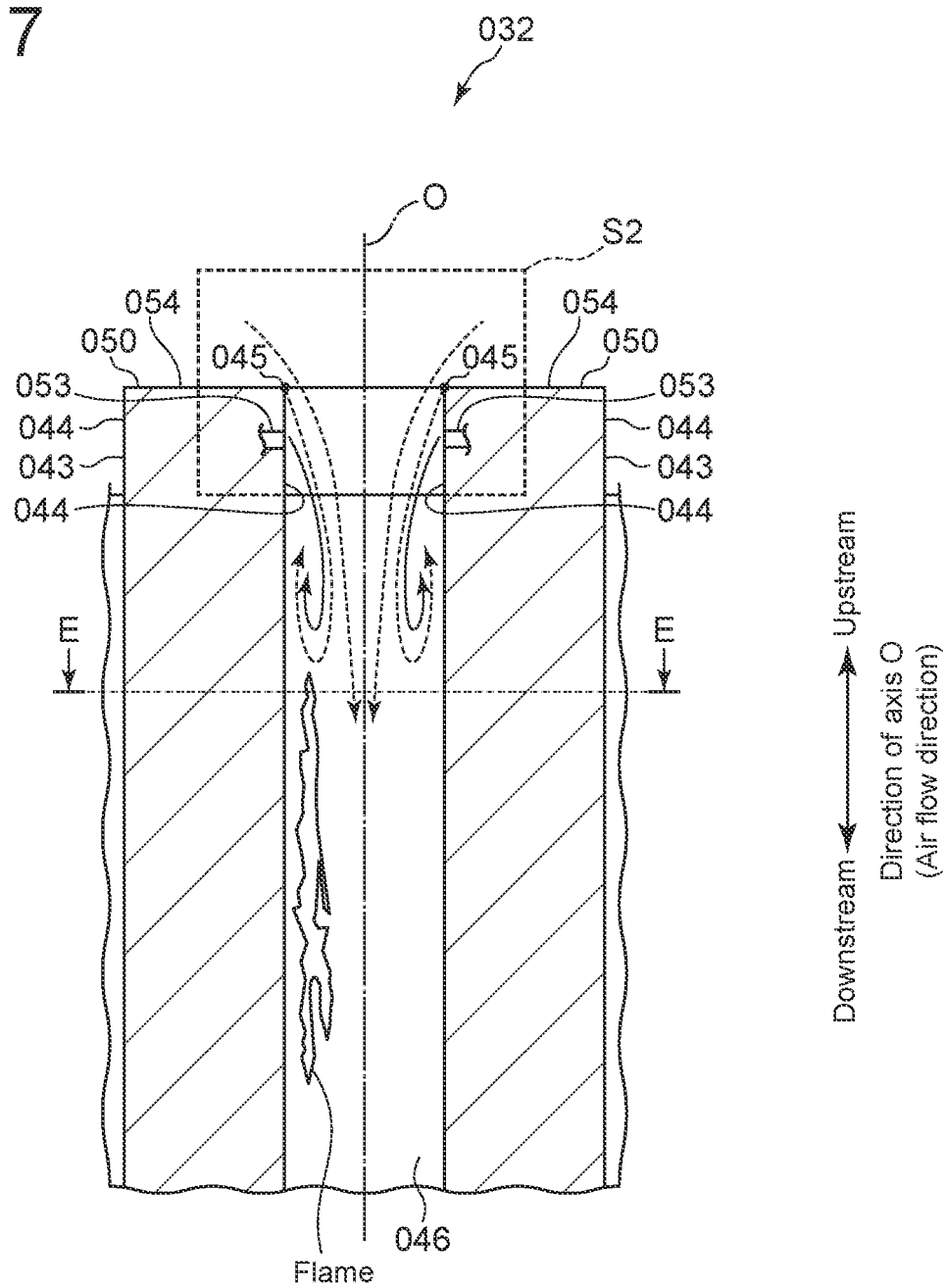
FIG. 7 is a schematic cross-sectional view of a portion of a burner assembly 032 according to a comparative embodiment.
Figure 8:
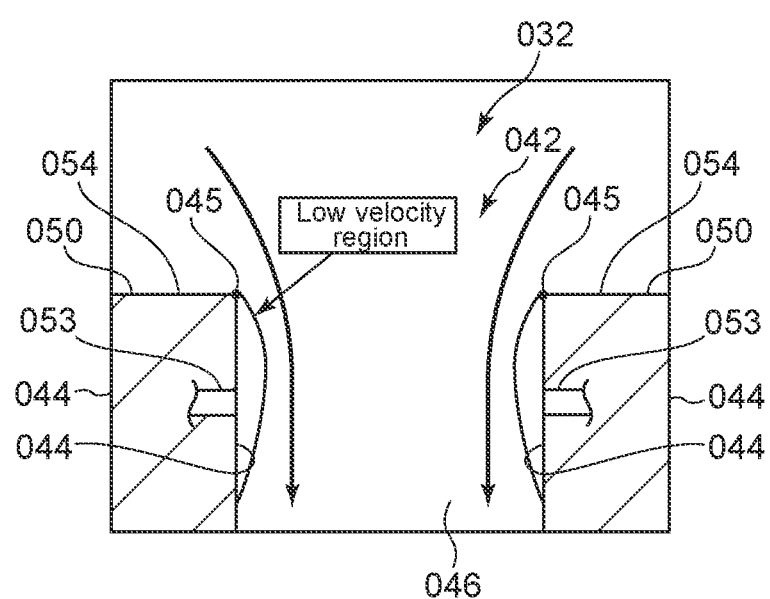
FIG. 8 is a diagram showing the distribution of flow velocity (axial flow velocity) in the direction along the central axis O in a region S2 of FIG. 7.
Figure 9:
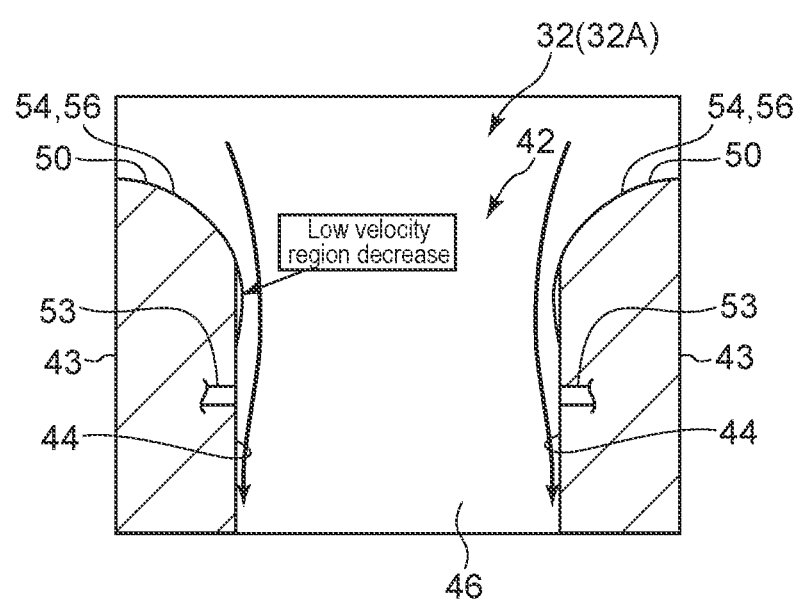
FIG. 9 is a diagram showing the distribution of flow velocity in the direction along the central axis O in a region S1 of FIG. 5.

FIG. 7 is a schematic cross-sectional view of a portion of a burner assembly 032 according to a comparative embodiment. FIG. 8 is a diagram showing the distribution of flow velocity (axial flow velocity) in the direction along the central axis O in a region S2 of FIG. 7. FIG. 9 is a diagram showing the distribution of flow velocity in the direction along the central axis O in a region S1 of FIG. 5.

In the comparative embodiment shown in FIG. 7, the top surface 054 of the protruding portion 050 of the fuel nozzle 043 is flat, and an edge 045 is formed at a connection between the top surface 054 of the protruding portion 050 and the side surface 040 of the protruding portion 050. This causes the separation of the air flow at the edge 045, so that a region of low flow velocity and high fuel concentration is likely to be formed in the vicinity of the fuel injection hole 053 (in the vicinity of the fuel jet), as shown in FIG. 8. As a result, the risk of flashback, which is a flashback from the outlet of the mixing passage 046, tends to increase.

In contrast, in the burner assembly 32A according to the above-described embodiment, since the top surface of the protruding portion 50 of the fuel nozzle 43 includes the convex curved surface 56, the separation of the flow from the top surface 54 of the fuel nozzle 43 toward the side surface 44 can be suppressed. Thus, a region of low flow velocity and high fuel concentration is unlikely to be formed in the vicinity of the fuel injection hole 53, as shown in FIG. 9. As a result, it is possible to reduce the risk of flashback and the risk of flame holding. Thus, it is possible to suppress burning damage of the burners 42 due to flashback and flame holding.

Next, a burner assembly 32 (32B) according to another embodiment will be described with reference to FIGS. 10 to 13.

Figure 10:
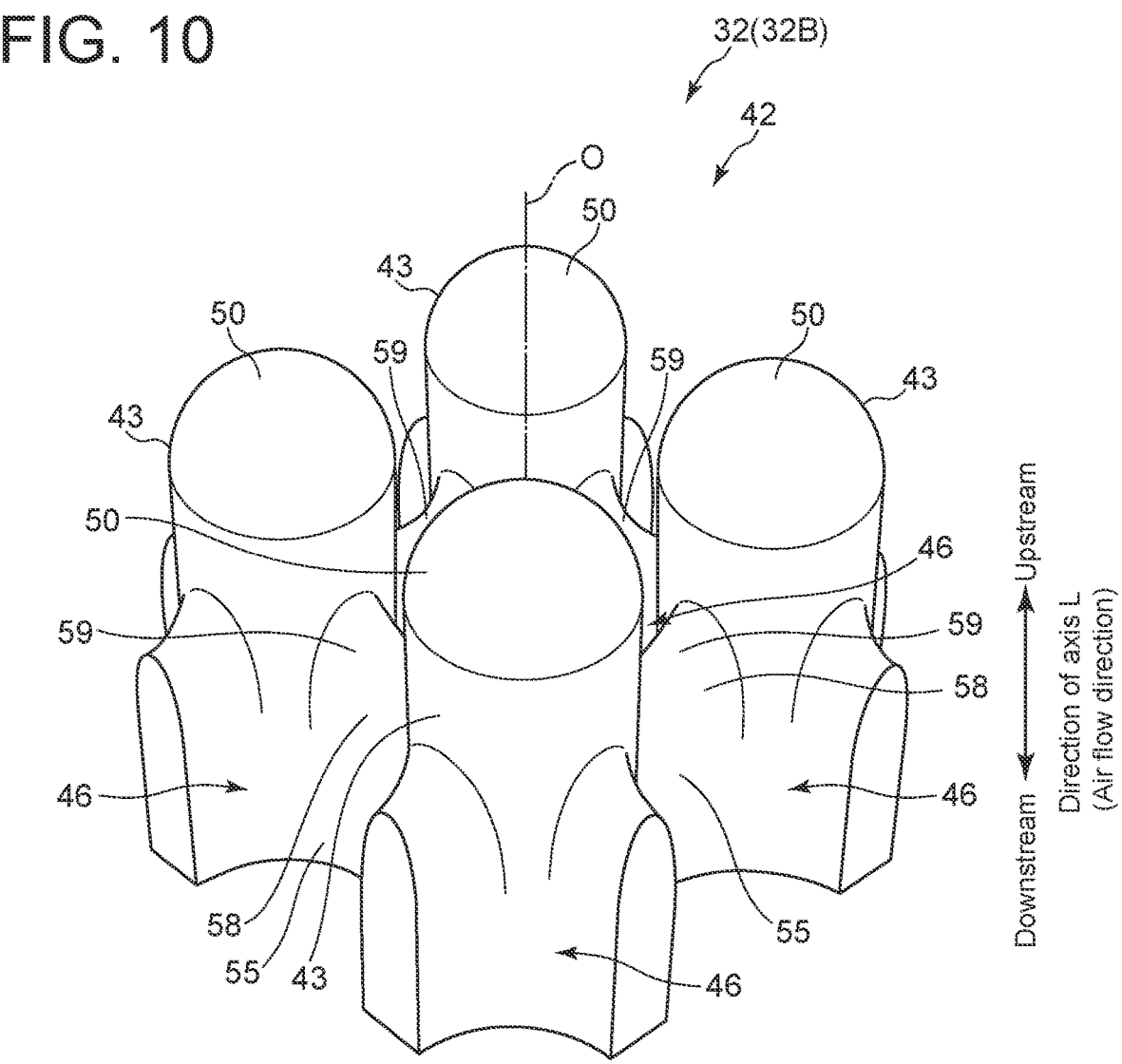
FIG. 10 is a schematic partial perspective view of a portion of a burner assembly 32 (32B) according to another embodiment.
Figure 11:
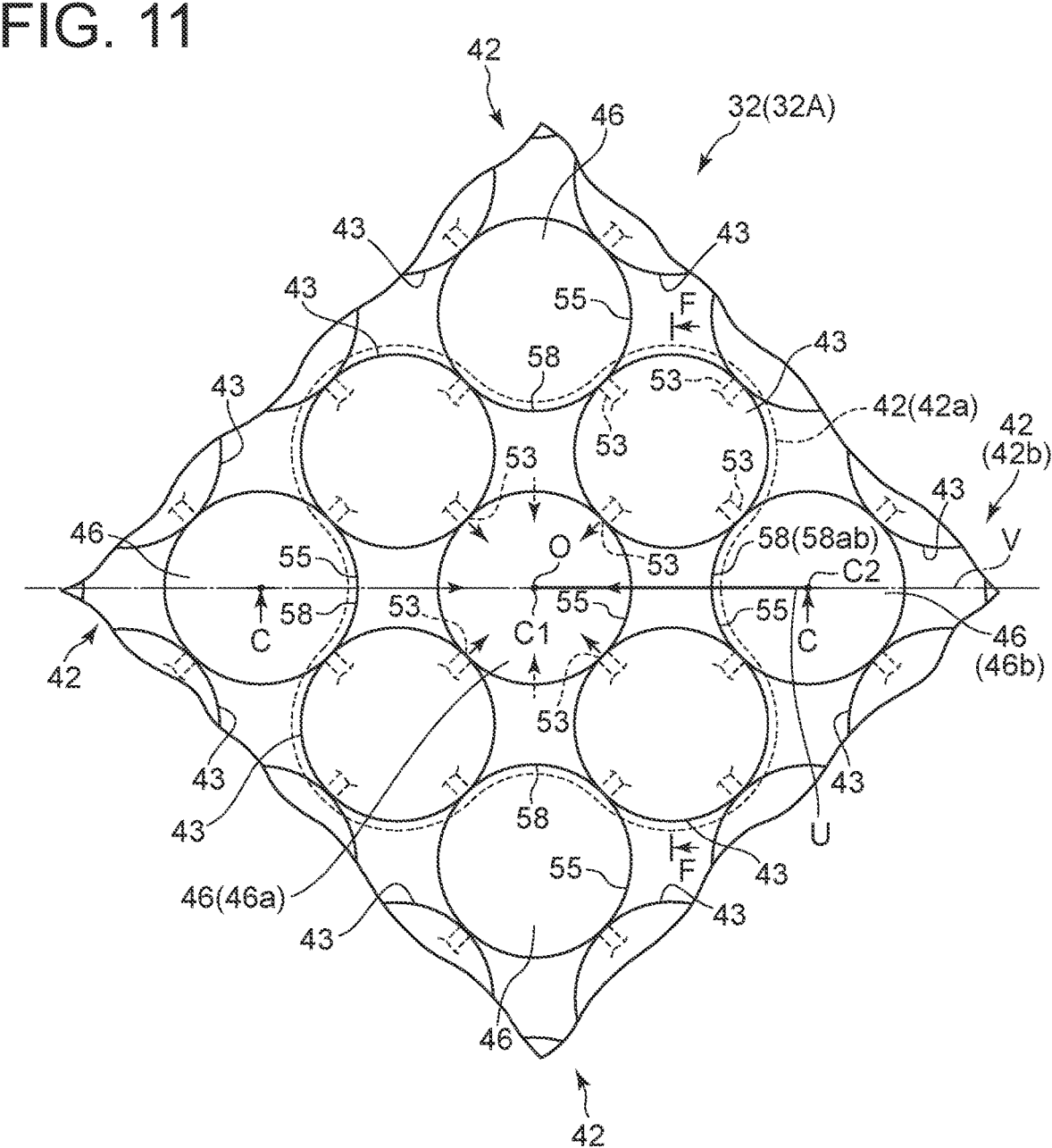
FIG. 11 is a schematic diagram of a portion of the burner assembly 32 (32B) when viewed from upstream in the air flow direction along the central axis L (example of view A in FIG. 2).
Figure 12:
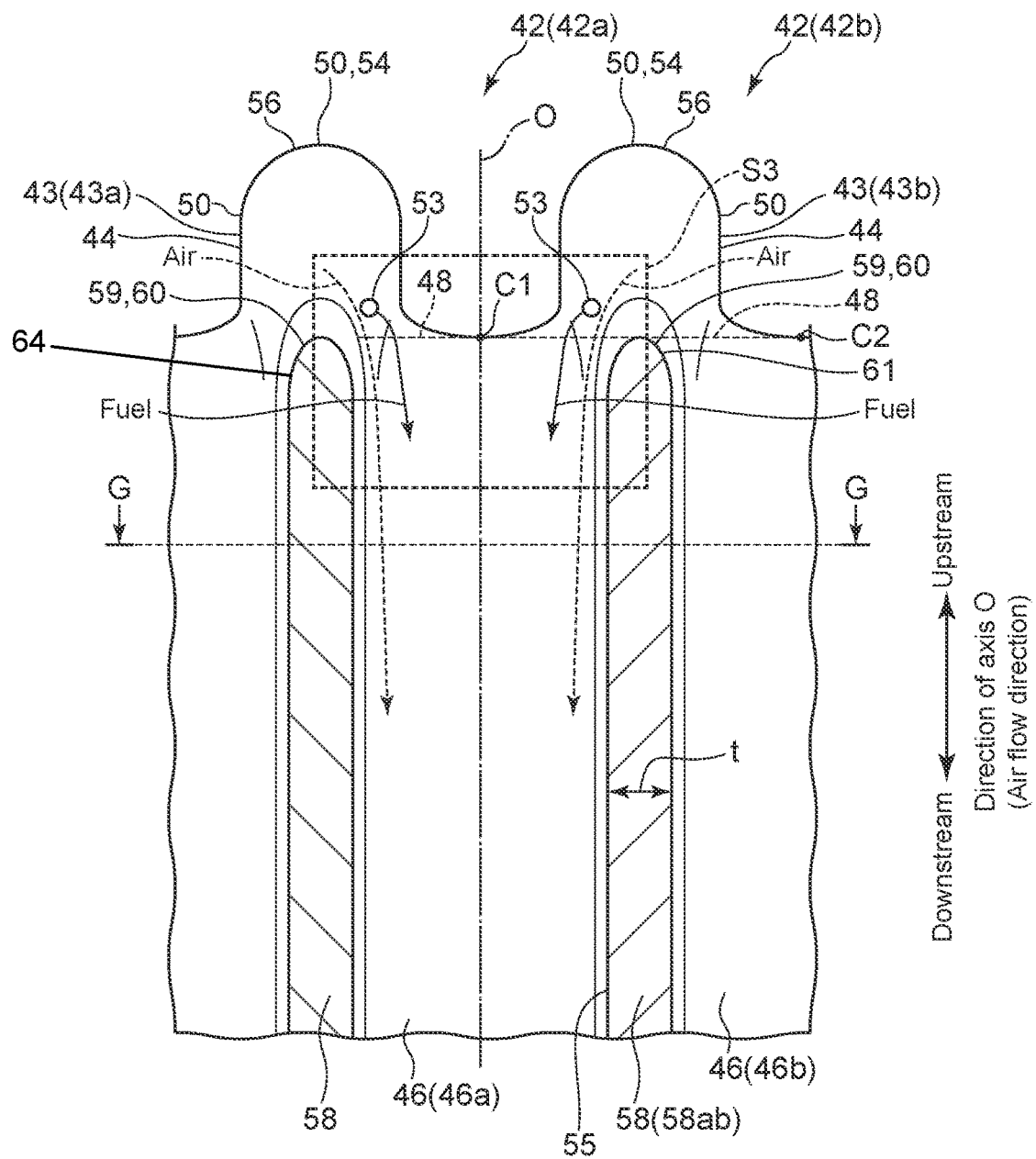
FIG. 12 is a schematic diagram showing a portion of the cross-section C-C in FIG. 11.
Figure 13:
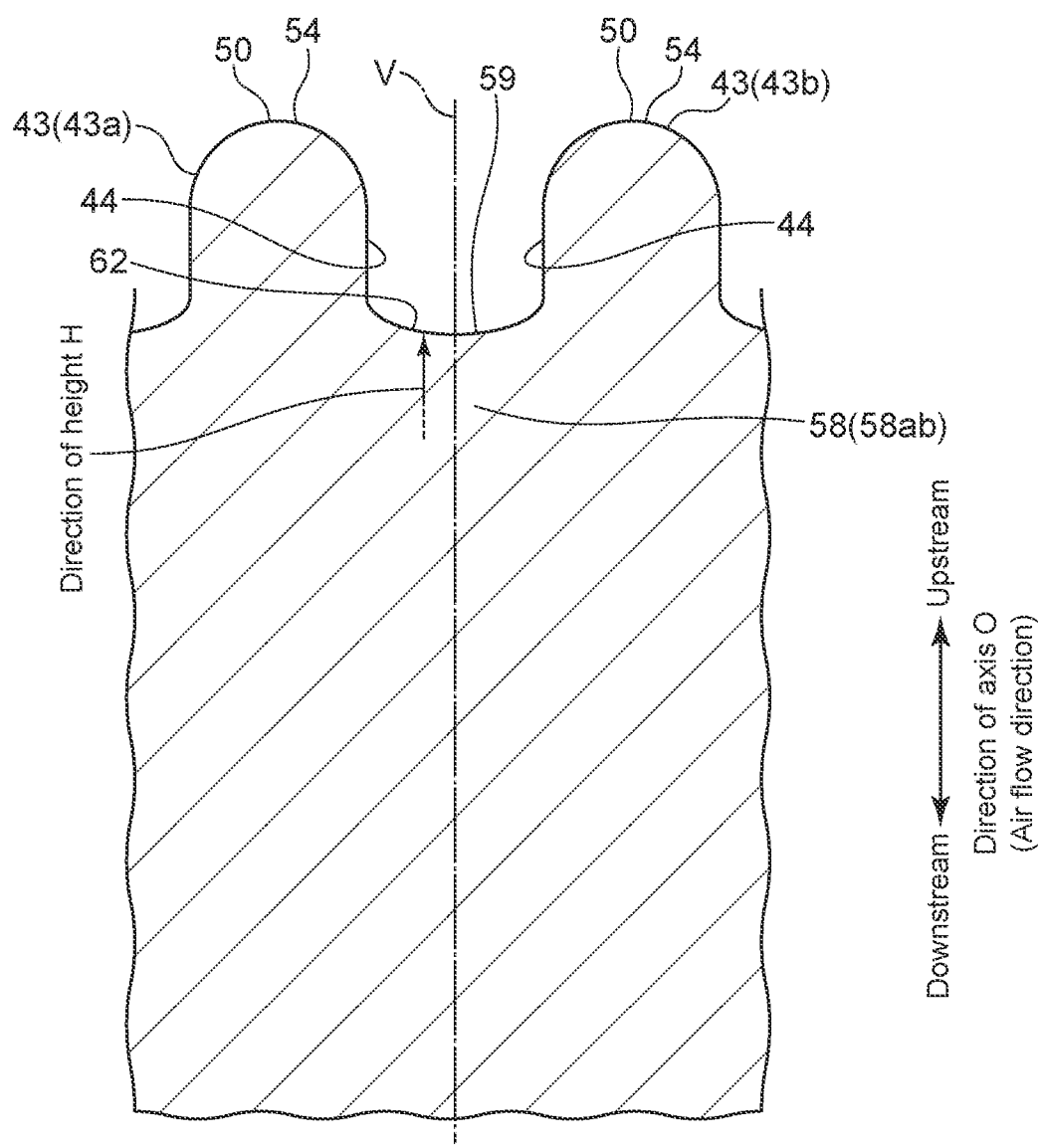
FIG. 13 is a schematic diagram showing a portion of the cross-section F-F in FIG. 11.

FIG. 10 is a schematic partial perspective view of a portion of a burner assembly 32 (32B) according to another embodiment. FIG. 11 is a schematic diagram of a portion of the burner assembly 32 (32B) when viewed from upstream in the air flow direction along the central axis L (example of view A in FIG. 2). FIG. 12 is a schematic diagram showing a portion of the cross-section C-C in FIG. 11. FIG. 13 is a schematic diagram showing a portion of the cross-section F-F in FIG. 11.

The burner assembly 32B shown in FIGS. 10 to 13 is different from the burner assembly 32A only in the shape of the end surface 59 of the partition portion 58, and the configuration is otherwise the same as the burner assembly 32A. Therefore, regarding the other configuration, the same reference numerals are given and the description thereof will be omitted.

As shown in FIG. 10, in the burner assembly 32B, the end surface 59 (the upstream end surface in the air flow direction) of the partition portion 58 that separates the two closest mixing passages 46 has a saddle shape. The shape of the end surface 59 of the partition portion 58 will now be described in detail.

As shown in FIG. 11, in the burner assembly 32B, among the plurality of burners 42, when two burners 42 adjacent to each other are conveniently referred to as a first burner 42 (42a) and a second burner 42 (42b), the passage wall 55 forming the mixing passage 46 (46a) of the first burner 42a and the passage wall 55 forming the mixing passage 46 (46b) of the second burner 42b share a partition portion 58 (58ab) that separates the mixing passage 46a of the first burner 42a from the mixing passage 46b of the second burner 42b.

As shown in FIG. 12, the thickness t of the partition portion 58ab in the cross-section C-C of the burner assembly 32B decreases upstream in the air flow direction in an upstream end portion 61 of the partition portion 58ab in the air flow direction, the upstream end portion 61 having a downstream end 64. Further, in the cross-section C-C, the upstream end surface 59 of the partition portion 58ab in the air flow direction includes a convex curved line 60. In the illustrated exemplary embodiment, in the cross-section C-C, the entire end surface 59 of the partition portion 58ab is composed of the convex curved line 60 that is smoothly curved. In the cross-section C-C, the end surface 59 of the partition portion 58ab may be formed in a streamline shape, for example. As shown in FIGS. 11 and 12, the cross-section C-C is a cross-section (first cross-section) passing through the center C1 of the inlet 48 of the mixing passage 46a of the first burner 42a and the center C2 of the inlet 48 of the mixing passage 46b of the second burner 42b and taken along the central axis O of the mixing passage 46a of the first burner 42a.

Here, as shown in FIGS. 11 and 13, among the four fuel nozzles 43 included in the first burner 42a, two fuel nozzles 43 with the protruding portions 50 adjacent to the partition portion 58ab are conveniently referred to as a first fuel nozzle 43 (43a) and a second fuel nozzle 43 (43b). That is, the protruding portion 50 of the second fuel nozzle 43b is disposed on the opposite side of a plane V including the cross-section C-C from the protruding portion 50 of the first fuel nozzle 43a.

As shown in FIG. 13, the height H of the partition portion 58ab increases as it approaches the protruding portion 50 of the first fuel nozzle 43a from the position of the plane V (the position of the cross-section C-C), and increases as it approaches the protruding portion 50 of the second fuel nozzle 43b from the position of the plane V. Further, in the cross-section F-F of the burner assembly 32B shown in FIG. 13, the upstream end surface 59 of the partition portion 58ab in the air flow direction includes a concave curved line 62 connecting the side surface 44 of the protruding portion 50 of the first fuel nozzle 43a and the side surface 44 of the protruding portion 50 of the second fuel nozzle 43b. As shown in FIG. 11, the cross-section F-F is a cross-section perpendicular to a straight line U connecting the center C1 of the inlet 48 of the mixing passage 46a of the first burner 42a and the center C2 of the inlet 48 of the mixing passage 46b of the second burner 42b.

The effects obtained by the burner assembly 32B will now be described in comparison with the burner assembly 32A.

Figure 14:
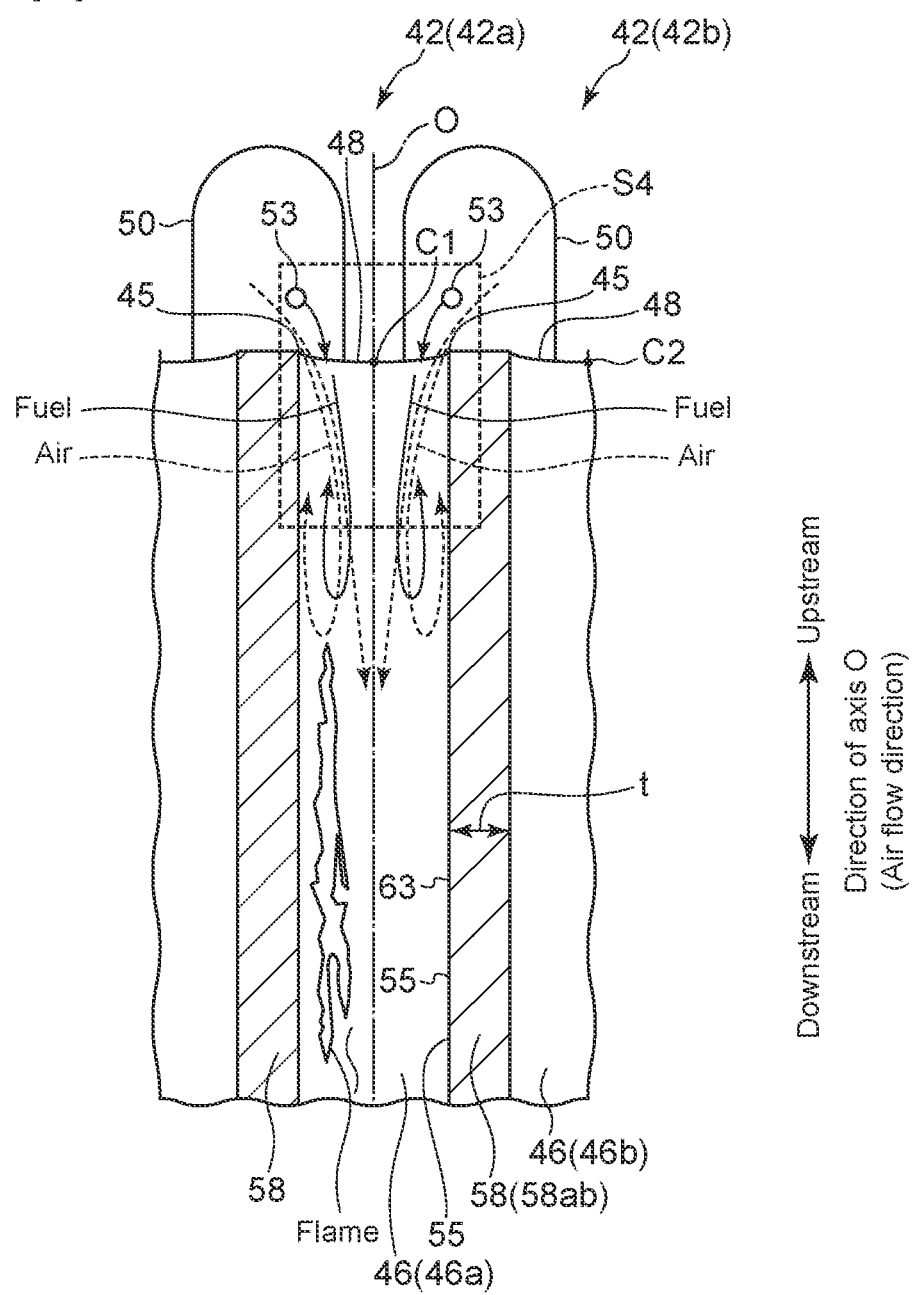
FIG. 14 is a diagram showing the flow of fuel and air in the cross-section C-C of FIG. 4 for the burner assembly 32 (32A).
Figure 15:
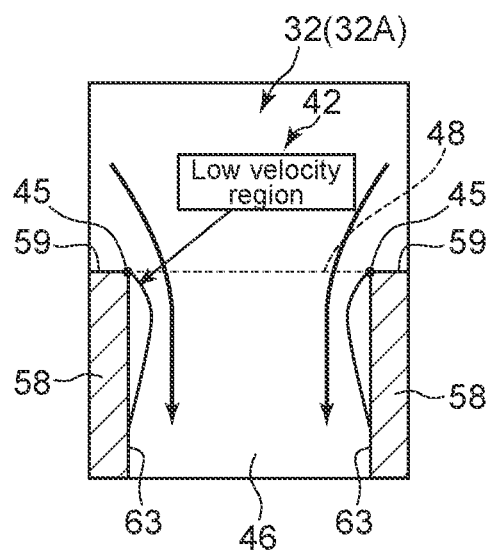
FIG. 15 is a diagram showing the distribution of flow velocity in the direction along the central axis O in a region S4 of FIG. 14 for the burner assembly 32 (32A).
Figure 16:
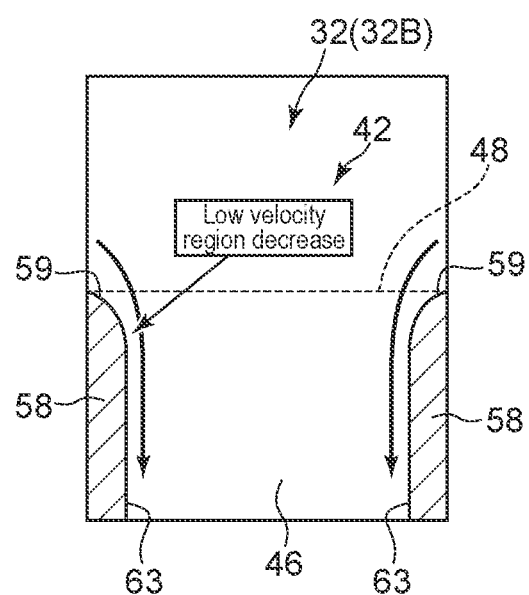
FIG. 16 is a diagram showing the distribution of flow velocity in the direction along the central axis O in a region S3 of FIG. 12 for the burner assembly 32 (32B).

FIG. 14 is a diagram showing the flow of fuel and air in the cross-section C-C of FIG. 4 for the burner assembly 32A. FIG. 15 is a diagram showing the distribution of flow velocity in the direction along the central axis O in a region S4 of FIG. 14 for the burner assembly 32A. FIG. 16 is a diagram showing the distribution of flow velocity in the direction along the central axis O in a region S3 of FIG. 12 for the burner assembly 32B.

In the burner assembly 32B, similarly, since the top surface 54 of the protruding portion 50 of the fuel nozzle 43 includes the convex curved surface 56 for example as shown in FIG. 12, the separation of the flow from the top surface 54 of the fuel nozzle 43 toward the side surface 44 can be suppressed as in the burner assembly 32A. Thus, a region of low flow velocity and high fuel concentration is unlikely to be formed in the vicinity of the fuel injection hole 53. As a result, it is possible to reduce the risk of flashback and the risk of flame holding. Thus, it is possible to suppress burning damage of the burners 42 due to flashback and flame holding.

As shown in FIG. 14, in the burner assembly 32A, since the end surface 59 of the partition portion 58 is formed in a flat shape, an edge 45 is formed at a connection between a wall surface 63 of the partition portion 58 (the wall surface of the passage wall 55 of the mixing passage 46) and the end surface 59 of the partition portion 58, and the air flow may be separated at the edge 45. Accordingly, as shown in FIG. 15, a region of low flow velocity and high fuel concentration may be formed in a limited range in the vicinity of the inlet 48 of the mixing passage 46. As a result, there is a limited but definite risk of flashback, which is a flashback from the outlet of the mixing passage 46.

In contrast, in the burner assembly 32B, as described with reference to FIG. 12, etc., the thickness t of the partition portion 58 decreases upstream in the air flow direction in the upstream end portion 61 of the partition portion 58 in the air flow direction. Further, in the cross-section C-C, the upstream end surface 59 of the partition portion 58 in the air flow direction includes the convex curved line 60. Thus, it is possible to suppress the separation of the flow in the vicinity of the inlet 48 of the mixing passage 46. Thus, as shown in FIG. 16, a region of low flow velocity and high fuel concentration is unlikely to be formed near the wall surface 63 of the partition portion 58 in the vicinity of the inlet 48 of the mixing passage 46. As a result, it is possible to reduce the risk of flashback and the risk of flame holding. Thus, it is possible to suppress burning damage of the burners 42 due to flashback and flame holding.

Further, in the burner assembly 32B, as described with reference to FIG. 13, etc., the height H of the partition portion 58 increases as it approaches the protruding portion 50 of the first fuel nozzle 43a from the position of the plane V (the position of the cross-section C-C), and increases as it approaches the protruding portion 50 of the second fuel nozzle 43b from the position of the plane V. Further, in the cross-section F-F shown in FIG. 13, the upstream end surface 59 of the partition portion 58ab in the air flow direction includes the concave curved line 62 connecting the side surface 44 of the protruding portion 50 of the first fuel nozzle 43a and the side surface 44 of the protruding portion 50 of the second fuel nozzle 43b. This allows the air flowing from the side surface 44 of the protruding portion 50 to the end surface 59 of the partition portion 58 to be smoothly introduced into the mixing passage 46, and a region of low flow velocity and high fuel concentration is unlikely to be formed near the wall surface 63 of the partition portion 58 in the vicinity of the inlet 48 of the mixing passage 46. Thus, it is possible to suppress burning damage of the burners 42 due to flashback and flame holding.

The present disclosure is not limited to the embodiments described above, but includes modifications to the embodiments described above, and embodiments composed of combinations of those embodiments.

For example, in the above-described embodiments, the burner assemblies 32A, 32B in which the plurality of fuel nozzles 43 and the passage walls 55 forming the plurality of mixing passages 46 are integrally inseparably formed as a single component have been described. However, each fuel nozzle and each mixing passage may be separately formed as a single component, or multiple fuel nozzles and multiple mixing passages may be composed of any number of components.

Further, in the above-described embodiments, each burner 42 includes a plurality of fuel nozzles 43, but each burner 42 may have only one fuel nozzle 43, or at least one fuel nozzle 43.

The contents described in the above embodiments would be understood as follows, for instance.

(1) A burner assembly according to the present disclosure is a burner assembly (e.g., the above-described burner assembly 32 (32A, 32B)) including a plurality of burners (e.g., the above-described burners 42) for mixing fuel and air. Each of the plurality of burners includes: at least one fuel nozzle (e.g., the above-described fuel nozzle 43) for injecting the fuel; and a mixing passage (e.g., the above-described mixing passage 46) into which the fuel injected from the at least one fuel nozzle and the air are introduced. Each of the at least one fuel nozzle includes a protruding portion (e.g., the above-described protruding portion 50) protruding upstream of an inlet (e.g., the above-described inlet 48) of the mixing passage in a flow direction of the air, and each of the at least one fuel nozzle includes at least one fuel injection hole (e.g., the above-described fuel injection hole 53) formed on a side surface (e.g., the above-described side surface 44) of the protruding portion. A top surface (e.g., the above-described top surface 54) of the protruding portion includes a convex curved surface (e.g., the above-described convex curved surface 56).

With the burner assembly described in (1), since the top surface of the protruding portion of the fuel nozzle includes the convex curved surface, the separation of the flow from the top surface of the fuel nozzle toward the side surface can be suppressed. Thus, a region of low flow velocity and high fuel concentration is unlikely to be formed in the vicinity of the fuel injection hole (in the vicinity of the fuel jet). As a result, the risk of flashback, which is a flashback from the outlet of the mixing passage, can be reduced.

(2) In some embodiments, in the burner assembly described in (1), the plurality of burners includes a first burner (e.g., the above-described first burner 42 (42a)), and a second burner (e.g., the above-described second burner 42 (42b)) having the mixing passage that is closest to the mixing passage of the first burner. A passage wall (e.g., the above-described passage wall 55) forming the mixing passage of the first burner and a passage wall (e.g., the above-described passage wall 55) forming the mixing passage of the second burner share a partition portion (e.g., the above-described partition portion 58 (58ab)) that separates the mixing passage of the first burner from the mixing passage of the second burner. A thickness (e.g., the above-described thickness t) of the partition portion decreases upstream in the flow direction of the air in an upstream end portion (e.g., the above-described end portion 61) of the partition portion in the flow direction of the air.

With the burner assembly described in (2), since the thickness of the partition portion decreases upstream in the air flow direction in the upstream end portion of the partition portion in the air flow direction, it is possible to suppress the separation of the flow on the surface of the partition portion in the vicinity of the inlet of the mixing passage. Thus, a region of low flow velocity and high fuel concentration is unlikely to be formed near the wall surface of the partition portion in the vicinity of the inlet of the mixing passage, reducing the risk of flashback and the risk of flame holding.

(3) In some embodiments, in the burner assembly described in (2), when a cross-section of the partition portion passing through center of the inlet of the mixing passage of the first burner and center of the inlet of the mixing passage of the second burner and taken along a central axis of the mixing passage of the first burner is defined as a first cross-section (e.g., the above-described cross-section C-C), an upstream end surface (e.g., the above-described end surface 59) of the partition portion in the flow direction of the air includes a convex curved line (e.g., the above-described convex curved line 60) in the first cross-section.

With the burner assembly described in (3), since the upstream end surface of the partition portion in the air flow direction includes the convex curved line in the first cross-section, it is possible to suppress the separation of the flow on the surface of the partition portion in the vicinity of the inlet of the mixing passage. Thus, a region of low flow velocity and high fuel concentration is unlikely to be formed near the wall surface of the partition portion in the vicinity of the inlet of the mixing passage, reducing the risk of flashback and the risk of flame holding.

(4) In some embodiments, in the burner assembly described in (3), the first burner includes a first fuel nozzle (e.g., the above-described first fuel nozzle 43 (43a)) and a second fuel nozzle (e.g., the above-described second fuel nozzle 43 (43b)) for injecting the fuel as the at least one fuel nozzle. The protruding portion of the first fuel nozzle is disposed adjacent to the partition portion, and the protruding portion of the second fuel nozzle is disposed adjacent to the partition portion on an opposite side of a plane (e.g., the above-described plane V) including the first cross-section from the protruding portion of the first fuel nozzle. A height (e.g., the above-described height H) of the partition portion increases as approaching the protruding portion of the first fuel nozzle from the first cross-section.

With the burner assembly described in (4), since the height of the partition portion increases as it approaches the protruding portion of the first fuel nozzle from the first cross-section, the air flowing from the side surface of the protruding portion of the first fuel nozzle to the end surface of the partition portion can be smoothly introduced into the mixing passage. Thus, a region of low flow velocity and high fuel concentration is unlikely to be formed near the wall surface of the partition portion in the vicinity of the inlet of the mixing passage. Thus, it is possible to suppress burning damage of the burners due to flashback and flame holding.

(5) In some embodiments, in the burner assembly described in (4), the end surface of the partition portion includes a concave curved line (e.g., the above-described concave curved line 62) connecting the side surface of the protruding portion of the first fuel nozzle and the side surface of the protruding portion of the second fuel nozzle in a cross-section (e.g., the above-described cross-section F-F) perpendicular to a straight line (e.g., the above-described straight line U) connecting the center of the inlet of the mixing passage of the first burner and the center of the inlet of the mixing passage of the second burner.

With the burner assembly described in (5), since the end surface includes the concave curved line connecting the side surface of the protruding portion of the first fuel nozzle and the side surface of the protruding portion of the second fuel nozzle in the cross-section perpendicular to the straight line, the air flowing from each of the side surface of the protruding portion of the first fuel nozzle and the side surface of the protruding portion of the second fuel nozzle to the end surface of the partition portion can be smoothly introduced into the mixing passage. Thus, a region of low flow velocity and high fuel concentration is unlikely to be formed near the wall surface of the partition portion in the vicinity of the inlet of the mixing passage. Thus, it is possible to suppress burning damage of the burners due to flashback and flame holding.

(6) A gas turbine combustor (e.g., the above-described combustor 4) according to the present disclosure includes: the burner assembly described in any one of (1) to (5); and a combustion liner (e.g., the above-described combustion liner 25) forming a space in which a flame is formed downstream of the burner assembly.

With the gas turbine combustor described in (6), since the gas turbine combustor includes the burner assembly described in any one of (1) to (5), it is possible to reduce the risk of flashback and the risk of flame holding. Consequently, it is possible to stably use the combustor.

(7) A gas turbine (e.g., the above-described gas turbine 100) according to the present disclosure includes: a compressor (e.g., the above-described compressor 2); a gas turbine combustor (e.g., the above-described combustor 4) configured to be supplied with air compressed by the compressor and fuel, and produce a combustion gas by combusting the fuel; and a turbine (e.g., the above-described turbine 6) driven by the combustion gas produced by the gas turbine combustor. The gas turbine combustor is the gas turbine combustor described in (6).

With the gas turbine described in (7), since the gas turbine includes the gas turbine combustor described in (6), it is possible to reduce the risk of flashback and the risk of flame holding and suppress burning damage of the burners. Consequently, it is possible to stably operate the gas turbine.

REFERENCE SIGNS LIST

2 Compressor
4 Combustor
6 Turbine
8 Rotor
10 Compressor casing
12,48 Inlet
14 Inlet guide vane
16,24 Stator vane
18, 26 Rotor blade
20 Casing
22 Turbine casing
25 Combustion liner
28 Exhaust casing
30 Exhaust chamber
32 (32A, 32B) Burner assembly
34 Cylindrical member
35 Support portion
36 Air passage
40 Casing
42 Burner
42a First burner
42b Second burner
43 Fuel nozzle
43a First fuel nozzle
43b Second fuel nozzle
44 Side surface
45 Edge
46, 46a, 46b Mixing passage
50 Protruding portion
53 Fuel injection hole
54 Top surface
55 Passage wall
56 Convex curved surface
58, 58ab Partition portion
59 End surface
60 Convex curved line
61 End portion
62 Concave curved line
63 Wall surface
100 Gas turbine

The invention claimed is:
1. A burner assembly, comprising a plurality of burners for mixing fuel and air,
wherein each of the plurality of burners includes:
at least one fuel nozzle for injecting the fuel; and
a mixing passage into which the fuel injected from the at least one fuel nozzle and the air are introduced via an inlet of the mixing passage,
wherein the plurality of burners includes a first burner, and a second burner having the mixing passage that is closest to the mixing passage of the first burner,
wherein the mixing passage of the first burner and the mixing passage of the second burner are separated by a partition portion,
wherein, for each of the first burner and the second burner, each of the at least one fuel nozzle includes a protruding portion protruding upstream from an upstream end portion of the partition portion in a flow direction of the air, and at least one fuel injection hole formed on a side surface of the protruding portion,
wherein, for each of the first burner and the second burner, a top surface of the protruding portion of each of the at least one fuel nozzle, which is an upstream end surface of the protruding portion in the flow direction of the air, includes a convex curved surface,
wherein the at least one fuel nozzle of the first burner includes a first fuel nozzle which is closest to the mixing passage of the first burner and the mixing passage of the second burner, and the at least one fuel injection hole of the first fuel nozzle includes a first fuel injection hole for supplying the fuel to the mixing passage of the first burner and a second fuel injection hole for supplying the fuel to the mixing passage of the second burner,
wherein, a cross-section of the partition portion in a plane passing through a center of the inlet of the mixing passage of the first burner and a center of the inlet of the mixing passage of the second burner and taken along a central axis of the mixing passage of the first burner is defined as a first cross-section,
wherein a thickness of the partition portion in the first cross-section decreases upstream in the flow direction of the air from a downstream end of the upstream end portion of the partition portion to an upstream end surface of the upstream end portion of the partition portion in the flow direction of the air, and
wherein the upstream end surface of the partition portion in the flow direction of the air includes a convex curved line in the first cross-section.

2. A gas turbine combustor, comprising:
the burner assembly according to claim 1; and
a combustion liner forming a space in which a flame is formed downstream of the burner assembly.

3. A gas turbine, comprising:
a compressor;
a gas turbine combustor configured to be supplied with air compressed by the compressor and fuel, and produce a combustion gas by combusting the fuel; and
a turbine driven by the combustion gas produced by the gas turbine combustor,
wherein the gas turbine combustor is the gas turbine combustor according to claim 2.

4. A burner assembly, comprising a plurality of burners for mixing fuel and air,
wherein each of the plurality of burners includes:
at least one fuel nozzle for injecting the fuel; and a mixing passage into which the fuel injected from the at least one fuel nozzle and the air are introduced via an inlet of the mixing passage, wherein the plurality of burners includes a first burner, and a second burner having the mixing passage that is closest to the mixing passage of the first burner, wherein the mixing passage of the first burner and the mixing passage of the second burner are separated by a partition portion, wherein, for each of the first burner and the second burner, each of the at least one fuel nozzle includes a protruding portion protruding upstream from an upstream end portion of the partition portion in a flow direction of the air, and at least one fuel injection hole formed on a side surface of the protruding portion, wherein, for each of the first burner and the second burner, a top surface of the protruding portion of each of the at least one fuel nozzle, which is an upstream end surface of the protruding portion in the flow direction of the air, includes a convex curved surface, wherein a thickness of the partition portion decreases upstream in the flow direction of the air from a downstream end of the upstream end portion of the partition portion to an upstream end surface of the partition portion in the flow direction of the air, wherein, a cross-section of the partition portion in a plane passing through a center of the inlet of the mixing passage of the first burner and a center of the inlet of the mixing passage of the second burner and taken along a central axis of the mixing passage of the first burner is defined as a first cross-section, the upstream end surface of the partition portion in the flow direction of the air includes a convex curved line in the first cross-section, wherein the first burner includes a first fuel nozzle and a second fuel nozzle as the at least one fuel nozzle for injecting the fuel, wherein the protruding portion of the first fuel nozzle is disposed adjacent to the partition portion, wherein the protruding portion of the second fuel nozzle is disposed adjacent to the partition portion such that the plane including the first cross-section is positioned between the protruding portion of the first fuel nozzle and the protruding portion of the second fuel nozzle, wherein the partition portion has a height vertically extending from a point on a downstream end surface of the partition portion to a point on the upstream end surface of the partition portion, and the height of the partition portion increases along the partition portion from the first cross-section to the first fuel nozzle, and wherein the upstream end surface of the partition portion includes a concave curved line connecting the side surface of the protruding portion of the first fuel nozzle and the side surface of the protruding portion of the second fuel nozzle in a second cross-section perpendicular to the first cross-section.

5. A burner assembly, comprising a plurality of burners for mixing fuel and air, wherein each of the plurality of burners includes:
 at least one fuel nozzle for injecting the fuel; and
 a mixing passage into which the fuel injected from the at least one fuel nozzle and the air are introduced via an inlet of the mixing passage, wherein the plurality of burners includes a first burner, and a second burner having the mixing passage that is closest to the mixing passage of the first burner, wherein, for each of the first burner and the second burner, each of the at least one fuel nozzle includes a protruding portion protruding upstream of an inlet of the mixing passage in a flow direction of the air, wherein, for each of the first burner and the second burner, each of the at least one fuel nozzle includes at least one fuel injection hole formed on a side surface of the protruding portion, wherein, for each of the first burner and the second burner, a top surface of the protruding portion of each of the at least one fuel nozzle includes a convex curved surface, wherein a passage wall forming the mixing passage of the first burner and a passage wall forming the mixing passage of the second burner share a partition portion that separates the mixing passage of the first burner from the mixing passage of the second burner, wherein a thickness of the partition portion decreases upstream in the flow direction of the air from a downstream end of an upstream end portion of the partition portion to an upstream end surface of the partition portion in the flow direction of the air, wherein, a cross-section of the partition portion in a plane passing through a center of the inlet of the mixing passage of the first burner and a center of the inlet of the mixing passage of the second burner and taken along a central axis of the mixing passage of the first burner is defined as a first cross-section, the upstream end surface of the partition portion in the flow direction of the air includes a convex curved line in the first cross-section, wherein the first burner includes a first fuel nozzle and a second fuel nozzle as the at least one fuel nozzle for injecting the fuel, wherein the protruding portion of the first fuel nozzle is disposed adjacent to the partition portion, wherein the protruding portion of the second fuel nozzle is disposed adjacent to the partition portion such that the plane including the first cross-section is positioned between the protruding portion of the first fuel nozzle and the protruding portion of the second fuel nozzle, and wherein the upstream end surface of the partition portion includes a concave curved line connecting the side surface of the protruding portion of the first fuel nozzle and the side surface of the protruding portion of the second fuel nozzle in a second cross-section perpendicular to the first cross-section.

* * * * *